United States Patent
Müller et al.

(10) Patent No.: US 10,851,675 B2
(45) Date of Patent: Dec. 1, 2020

(54) MOUNTING SYSTEM FOR A GAS TURBINE, AND ASSOCIATED GAS TURBINE

(71) Applicant: Siemens Aktiengesellschaft, Munich (DE)

(72) Inventors: Dirk Müller, Mulheim a.d.Ruhr (DE); Christian Kowalzik, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/628,665

(22) PCT Filed: Jun. 14, 2018

(86) PCT No.: PCT/EP2018/065837
§ 371 (c)(1),
(2) Date: Jan. 4, 2020

(87) PCT Pub. No.: WO2019/011575
PCT Pub. Date: Jan. 17, 2019

(65) Prior Publication Data
US 2020/0217224 A1    Jul. 9, 2020

(30) Foreign Application Priority Data
Jul. 12, 2017   (DE) .......................... 10 2017 211 945

(51) Int. Cl.
*F16M 11/00* (2006.01)
*F01D 25/28* (2006.01)

(52) U.S. Cl.
CPC ........ *F01D 25/285* (2013.01); *F05D 2230/72* (2013.01); *F05D 2240/90* (2013.01); *F05D 2260/02* (2013.01)

(58) Field of Classification Search
CPC ............................ E02D 29/1481; E02D 29/14
See application file for complete search history.

(56) References Cited

U.S. PATENT DOCUMENTS 4,557,447 A * 12/1985 Combe ................... F16L 3/127
248/62
5,697,729 A * 12/1997 Bowman ............. E02D 29/1427
404/25

(Continued)

FOREIGN PATENT DOCUMENTS

DE         10348447 A1    7/2005
EP          2236939 A1   10/2010

(Continued)

OTHER PUBLICATIONS

PCT International Search Report and Written Opinion of International Searching Authority dated Oct. 4, 2018 corresponding to PCT International Application No. PCT/EP2018/065837 filed Jun. 14, 2018.

*Primary Examiner* — Amy J. Sterling
(74) *Attorney, Agent, or Firm* — Wolter Van Dyke Davis, PLLC

(57) ABSTRACT

A mounting system for a gas turbine, includes two rails, on each rail a fastening portion for fastening the rail on a manhole of the gas turbine, and for each rail at least one displacement element, which can be displaced along the rail. With the aid of such a mounting system, maintenance tools and/or turbine components are straightforwardly passed through a manhole and displaced to their location of use.

12 Claims, 1 Drawing Sheet

(56) References Cited

U.S. PATENT DOCUMENTS

| | | | |
|---|---|---|---|
| 6,189,211 B1 * | 2/2001 | Suter | F01D 25/26 |
| | | | 29/402.04 |
| 6,367,843 B1 * | 4/2002 | Fetzer | B01J 3/03 |
| | | | 285/24 |
| 6,698,481 B1 * | 3/2004 | Marin | B60B 21/12 |
| | | | 152/381.5 |
| 10,253,650 B2 | 4/2019 | Muller et al. | |
| 2013/0315714 A1 | 11/2013 | Muller | |
| 2014/0356184 A1 * | 12/2014 | Ebbesen | F03D 15/00 |
| | | | 416/244 R |
| 2015/0060632 A1 | 3/2015 | Ralls et al. | |
| 2017/0268382 A1 | 9/2017 | Muller et al. | |

FOREIGN PATENT DOCUMENTS

| | | | |
|---|---|---|---|
| EP | 2655808 | A1 | 10/2013 |
| EP | 2990616 | A1 | 3/2016 |
| EP | 2993314 | A1 | 3/2016 |
| WO | 2016078926 | A1 | 5/2016 |

\* cited by examiner

MOUNTING SYSTEM FOR A GAS TURBINE, AND ASSOCIATED GAS TURBINE

CROSS REFERENCE TO RELATED APPLICATIONS

This application is the US National Stage of International Application No. PCT/EP2018/065837 filed 14 Jun. 2018, and claims the benefit thereof. The International Application claims the benefit of German Application No. DE 10 2017 211 945.4 filed 12 Jul. 2017. All of the applications are incorporated by reference herein in their entirety.

FIELD OF INVENTION

The invention relates to a mounting system for a gas turbine. The invention furthermore relates to a gas turbine with a manhole formed on its outer housing and with such a mounting system.

BACKGROUND OF INVENTION

During maintenance tasks on a gas turbine, in particular a stationary gas turbine, various tasks are performed in the exhaust gas duct. In the case of gas turbines, it is thus possible to make the region to which hot gas is applied in the interior of a gas turbine accessible to maintenance personnel via a specially designed maintenance access means, known as a manhole.

A method for removing a bearing body from the rotor of a stationary gas turbine is known, for example, from EP 2 655 808 A1. A shaft extension is hereby fastened at the relevant end of the rotor and the rotor is simultaneously supported and/or retained by the weight of the rotor in order to release the bearing body. The sliding elements are then attached between the bearing body and the rotor, after which the bearing body can be shifted along the machine axis onto the shaft extension and be parked there. Such a shaft extension is very large, long, and bulky such that although it passes through the manhole, it then needs to be rotated and moved toward the bearing body.

Because the manhole has only a restricted opening and the maintenance tools such as, for example, the shaft extension can move only in the manhole opening, in some circumstances the travel is not sufficient or it is very complex to transport the maintenance tools to a suitable point or to position them. This problem is solved, for example, by eyelets being attached to the ceiling in order to widen the range of mounting and lifting points for the travel of the maintenance tools or turbine components.

SUMMARY OF INVENTION

The object of the present invention is to propose a novel mounting system by means of which maintenance tools and/or turbine components are easily passed through a manhole and moved to the location where they are used.

The object is achieved according to the invention by a mounting system for a gas turbine, comprising two units which can be connected to each other, wherein each unit has a rail, a fastening section in the shape of a segment of a circle, on the rail, for fastening the rail to a manhole of the gas turbine, and at least one displacement element per rail, which can be displaced along the rail.

The object is furthermore achieved according to the invention by a gas turbine with a manhole formed on its outer housing and with such a mounting system, wherein the manhole has a flange on its circumference and wherein the fastening sections are connected detachably to the flange in such a way that the rails with the displacement elements extend in the interior of the gas turbine.

The advantages described in relation to the mounting system and embodiments are transferable analogously to the gas turbine.

The invention is based on the idea of designing the mounting system in such a way that on one side it can be fastened very simply and securely to one side of the manhole of the gas turbine and on the other side it enables a high degree of freedom of movement inside the gas turbine. This is achieved by the mounting system having a two-part design such that both units of the mounting system can be fastened independently of each other at the location where they are used. Both units are here advantageously have an identical construction. Furthermore, the fastening sections of the mounting system correspond in terms of shape and size to a flange of the manhole in such a way that they can be laid on top of the flange and connected detachably thereto, in particular can be screwed to it. This is achieved in particular by the fastening sections in the shape of a segment of a circle, wherein a radius of the segment of a circle of each of the fastening sections corresponds essentially to a radius of the flange of the manhole. The annular flange is hereby in particular formed by an annular bearing surface around the circumference of the manhole, wherein a cover is fitted on the flange during the operation of the gas turbine.

The fastening sections of the mounting system are in particular configured as arcs of a circle or segments of a circle with an arc radius and a length which is defined by a chord of the circle. Because the arc radius of the fastening sections corresponds essentially to the radius of the flange, the fastening sections can be laid with their outer contour flush on the complementary fastening section and be fitted securely in this position.

Both parts or units of the mounting system are fitted on the flange of the manhole, situated diametrically opposite each other, such that there is sufficient space centrally between the two fastening sections so that tools or turbine components can pass through and be introduced into the manhole or for maintenance workers to enter the interior of the gas turbine. The fastening sections which lie on the flange are here spaced apart from the rails such that, when the mounting system is fitted, the fastening sections lie on the flange whilst the rails extend in the interior of the gas turbine.

The tools or turbine components are mounted and displaced to a desired position via the two rails of the mounting system. The rails are connected to the respective fastening section via connecting bars. Each of the rails here extends parallel to the chord of a circle of the fastening section. In the fitted state, the rails also extend parallel to each other. Both ends of the rails are the same distance from the fastening section. The rails are here arranged so that they are spaced apart heightwise by a certain amount from the fastening sections such that, when the mounting system is fitted, the fastening sections lie on the flange outside the manhole and the rails simultaneously extend completely in the interior of the turbine.

At least one displacement element which is designed in particular as a trolley which can be displaced along the respective rail is provided on each of the rails. The displacement elements in particular have eyelets on which chain hoists which are used to carry the maintenance tools or components can be mounted.

The essential advantage of such a mounting system is that it can be repeatedly used by the detachable connection to the manhole. It can additionally be used in multiple types of turbine because its shape and dimensions are matched solely to the size of the manhole.

According to an embodiment, the mounting system comprises two cross-struts which extend transversely with respect to both rails and interconnect the rails. As a result, increased rigidity of the system is ensured in the case of an asymmetrical weight distribution, in particular against rotation. The cross-struts are arranged in the region of the ends of the respective rails. The cross-struts here advantageously lie on the sides of the rails which face the opening of the manhole.

According to a further embodiment, each cross-strut is hinged on one of the rails. The cross-strut is fastened on the rail with a first end and the cross-strut is here hinged about a pivot point. The cross-struts can be pivoted at least between a first pivoted position in which it extends parallel to the rail and a second pivoted position in which it extends transversely with respect to the rail and its opposite end reaches the second rail. In other words, in the hinged-back state, the cross-strut lies on the first rail and, in the hinged-out state, it extends perpendicularly with respect to the first rail on which it is in particular prefitted and can be fastened with its other end on the second rail such that it mechanically interconnects both rails. Both cross-struts can here be fitted pivotably on a common rail, or each cross-strut is fitted pivotably on a different rail.

Abutment elements for supporting the rails on the turbine housing are advantageously provided at the ends of the rails. The height of the abutment elements can in particular be adjusted. They are designed, for example, as set screws, the height of which can be modified by tightening and untightening.

Two displacement elements which can be interconnected via a safety device are advantageously provided per rail. By means of the safety device, the displacement elements are locked in position, in particular when the rail is being passed through the manhole, so that there is a reduced risk of collision when there is undesired slippage of the displacement elements.

BRIEF DESCRIPTION OF THE DRAWINGS

An exemplary embodiment of the invention is explained in detail with the aid of the drawings, in which.

DETAILED DESCRIPTION OF INVENTION

Figure 1:
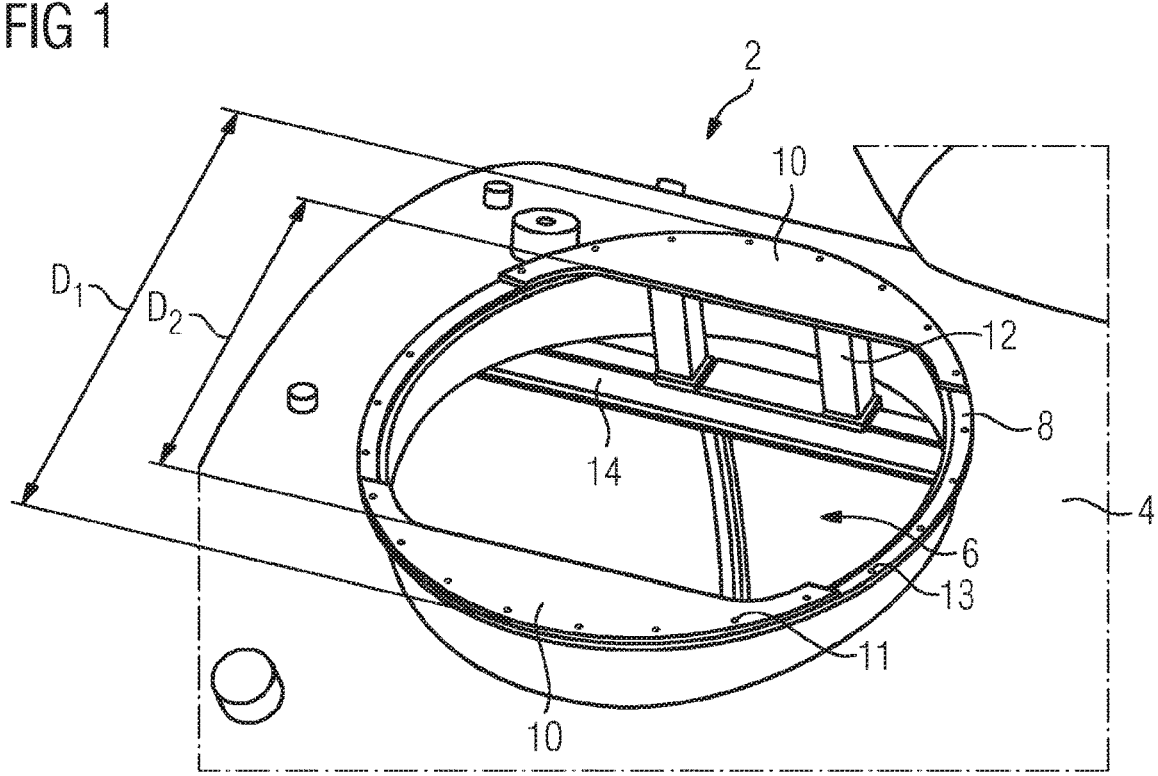
FIG. 1 shows a perspective view of a mounting system which is fitted on a manhole of a gas turbine.

The same reference numerals have the same meaning in the Figures.

A part of a gas turbine 4 can be seen in FIG. 1 which has a manhole 6 with an annular flange 8 in which a two-part mounting system 2 is fitted. The mounting system 2 has two fastening sections 10 which are configured in the shape of a segment of a circle in the exemplary embodiment shown. Bores 11 through which screws (not shown in detail) can be passed are formed along the arc of a circle of the fastening sections 10, wherein the screws are then passed through corresponding bores 13 on the flange 8 of the manhole 6 in order to produce a screwed connection between the flange 8 and the fastening sections 10.

When the mounting system 2 has been fitted, the distance $D_1$ between the two diametrically furthest removed points of the fastening sections 10 is between 900 mm and 1500 mm. This distance corresponds approximately to the diameter of the manhole 6. The distance $D_2$ between the chords of a circle of the fastening sections 10 is between 800 mm and 1200 mm, and in the exemplary embodiment shown $D_2$=900 mm.

Figure 2:
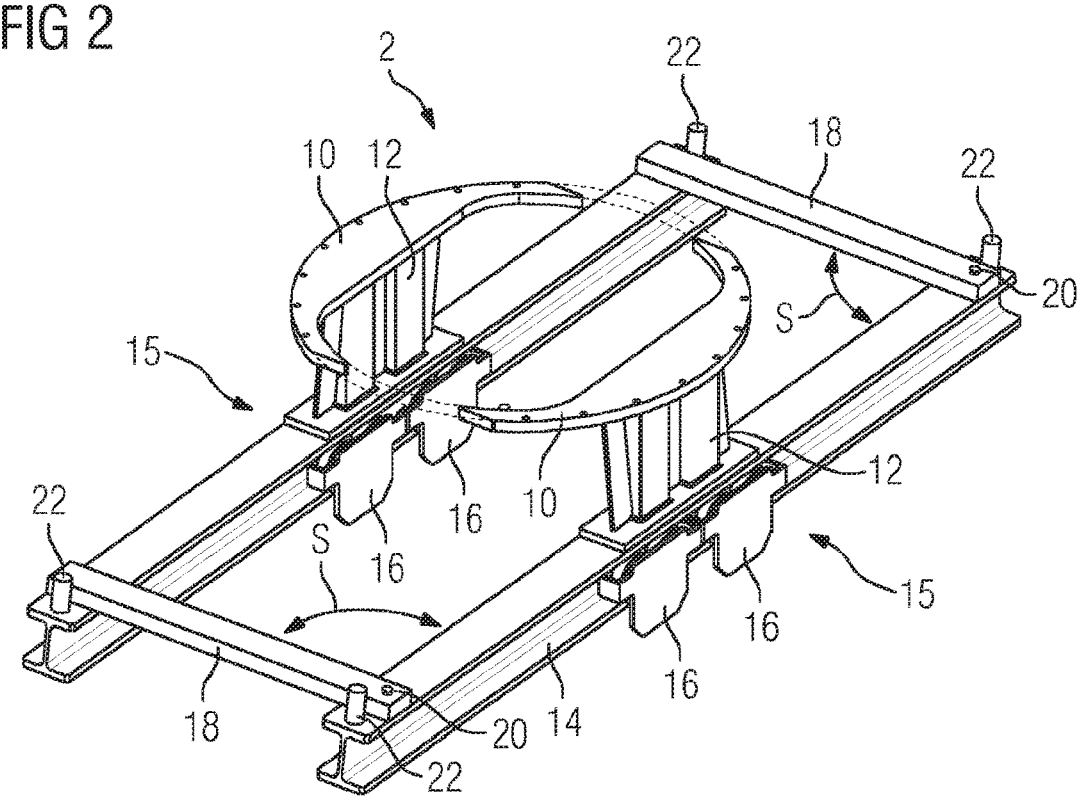
FIG. 2 shows a perspective view of the detailed structure of the mounting system according to FIG. 1.

A rail 14 is arranged on each of the two fastening sections 10 via connecting bars 12. As can be seen from FIG. 2, there is a symmetrical arrangement of the respective rail 14 with respect to the associated fastening section 10 such that both ends of the rail 14 are the same distance from the fastening section 10. At least one displacement element, in this case a trolley which can be displaced along the whole rail 14, is provided for each rail 14. In the exemplary embodiment according to FIG. 2, in each case two trolleys 16 which can be displaced independently of each other are provided in each case for each rail 14. The trolleys 16 can be interconnected in particular via a safety device (not shown in detail here) such that they are secured in their position and cannot make any undesired movements along the rails 14.

The mounting system 2 here has two units 15, wherein each unit 15 comprises a fastening section 10 and a rail 14 with the associated displacement elements 16. Both units 15 are identical in the exemplary embodiment shown.

The mounting system 2 furthermore comprises two cross-struts 18 which interconnect the two rails 14 in the region of the ends of the rails 14. Both units 15 are coupled mechanically to each other by the cross-struts 18. Both cross-struts 18 are retained on one of the rails 14 so that they can pivot with a first end about a pivot point 20. The cross-struts can thus execute a pivoting movement in the direction of the arrows S. In the hinged-out state shown in FIG. 2, the second end of the cross-struts 18 is fastened on the second rail 14.

The rails 14 are dimensioned such that the cross-struts 18 lie completely on the respective rail 14 in the hinged-back state, i.e. each of the rails has a length which is composed of twice the length of the cross-struts 18 and additionally the length of the region for fastening the connecting bars 12.

Abutment elements 22 for supporting the rails 14 on a turbine housing are additionally positioned at the ends of the rails 14. The abutment elements 22 are formed, for example, as set screws.

The mounting system 2 can also comprise further elements, for example ones which are placed between the fastening sections 10 and the flange 8 of the manhole 6 in order to distribute the force of the fastening sections 10 over a greater area.

The mounting system 2 is fitted, for example, in the following manner: with the trolleys 16 secured, in the first step the first rail 14 is introduced through the manhole 6. The rail 14 is here first brought into a vertical position. The rail 14 is returned to a horizontal position only when inside the gas turbine 4. The fastening section 10 is lowered onto the flange 8 of the manhole 6, wherein care needs to be taken that the bores 13 of the flange 8 and the bores 11 of the fastening section 10 are aligned. The screws are then screwed into the bores 11 and 13.

The second rail 14 is also fitted in the same fashion.

Lastly, the cross-struts are hinged out and secured and the set screws 22 are unscrewed until they lie against the housing of the gas turbine 4 so that the rails 14 are prevented from shifting under load.

In order to use the mounting system 2, the chain hoists are mounted on the four trolleys 16. The safety device for the trolleys 16 is then released and they are displaced along the rails 14.

The invention claimed is:

1. A mounting system for a gas turbine, comprising:
two units which can be connected to each other,
wherein each unit has a rail, a fastening section in the shape of a segment of a circle, on the rail, for fastening the rail to a manhole of the gas turbine,
at least one displacement element per rail, which can be displaced along the rail, and
two cross-struts which extend transversely with respect to both rails and interconnect the rails.

2. The mounting system as claimed in claim 1, wherein both units have an identical construction.

3. The mounting system as claimed in claim 1, wherein each cross-strut is hinged on one of the rails.

4. The mounting system as claimed in claim 1, wherein abutment elements for supporting the rails on a turbine housing are provided at ends of the rails.

5. The mounting system as claimed in claim 1, wherein two displacement elements which can be interconnected via a safety device are provided per rail.

6. A gas turbine comprising:
the manhole formed on an outer housing of the gas turbine, and
the mounting system as claimed in claim 1,
wherein the manhole has a flange on its circumference and
wherein the fastening sections are connected detachably to the flange in such a way that the rails with the displacement elements extend in the interior of the gas turbine.

7. The gas turbine as claimed in claim 6,
wherein a radius of the segment of the circle of the fastening section corresponds essentially to a radius of the flange of the manhole.

8. A mounting system for a gas turbine, comprising:
a first unit comprising: a first fastening section comprising a plurality of first bolt holes therethrough and arranged in a first arc; a first rail; and a first connector bar configured to hold the first rail apart from the first fastening section; and
a second unit comprising: a second fastening section comprising a plurality of second bolt holes therethrough and arranged in a second arc; a second rail; and a second connector bar configured to hold the second rail apart from the second fastening section;
wherein when the first fastening section and the second fastening section are arranged such that the first arc and the second arc form a circle, the first connector bar and the second connector bar are disposed radially within a cylinder defined by the circle and position the first rail and the second rail parallel to each other and transverse to the cylinder.

9. The mounting system as claimed in claim 8, further comprising a displacement element configured to move along the first rail.

10. The mounting system as claimed in claim 8, wherein when the first fastening section and the second fastening section are arranged such that the first arc and the second arc form the circle, the first fastening section and the second fastening section are configured to abut a flat end-surface of a circular manhole opening flange.

11. The mounting system as claimed in claim 8, further comprising two cross-struts which extend transversely with respect to both rails and interconnect the rails.

12. The mounting system as claimed in claim 11, wherein the two cross-struts are pivotally mounted to respective ends of the first rail.

* * * * *